United States Patent
Zheng

(10) Patent No.: US 10,621,220 B2
(45) Date of Patent: Apr. 14, 2020

(54) METHOD AND SYSTEM FOR PROVIDING A PERSONALIZED SNIPPET

(71) Applicant: Yahoo Holdings, Inc., Sunnyvale, CA (US)

(72) Inventor: Hao Zheng, Beijing (CN)

(73) Assignee: Oath Inc., New York, NY (US)

(*) Notice: Subject to any disclaimer, the term of this patent is extended or adjusted under 35 U.S.C. 154(b) by 605 days.

(21) Appl. No.: 14/399,696

(22) PCT Filed: Jul. 8, 2014

(86) PCT No.: PCT/CN2014/081851
§ 371 (c)(1),
(2) Date: Nov. 7, 2014

(87) PCT Pub. No.: WO2016/004584
PCT Pub. Date: Jan. 14, 2016

(65) Prior Publication Data
US 2016/0283585 A1  Sep. 29, 2016

(51) Int. Cl.
*G06F 16/33* (2019.01)
*G06F 16/34* (2019.01)

(52) U.S. Cl.
CPC .......... *G06F 16/345* (2019.01); *G06F 16/334* (2019.01)

(58) Field of Classification Search
CPC ......... G06F 17/30675; G06F 17/30719; G06F 16/345; G06F 16/334
USPC ....................................................... 707/723
See application file for complete search history.

(56) References Cited

U.S. PATENT DOCUMENTS

| | | | | |
|---|---|---|---|---|
| 8,631,006 B1* | 1/2014 | Haveliwala | ....... | G06F 17/30867 707/722 |
| 8,849,817 B1* | 9/2014 | Mysen | ............. | G06F 17/30864 707/732 |
| 9,235,626 B2* | 1/2016 | Liu | ..................... | G06F 17/3053 |
| 2005/0216434 A1* | 9/2005 | Haveliwala | ....... | G06F 17/30867 |
| 2005/0228797 A1* | 10/2005 | Koningstein | .......... | G06Q 30/02 |
| 2005/0256866 A1* | 11/2005 | Lu | ..................... | G06F 17/30867 |
| 2008/0281810 A1* | 11/2008 | Smyth | ............... | G06F 17/30864 |
| 2009/0198667 A1* | 8/2009 | Groeneveld | ...... | G06F 17/30719 |
| 2009/0210381 A1* | 8/2009 | Singh | ................ | G06F 17/30696 |

(Continued)

FOREIGN PATENT DOCUMENTS

| CN | 101004737 A | 7/2007 |
|---|---|---|
| CN | 102163229 A | 8/2011 |

OTHER PUBLICATIONS

International Search Report and Written Opinion dated Apr. 1, 2015 in International Application PCT/CN2014/081851.

*Primary Examiner* — James Trujillo
*Assistant Examiner* — Jessica N Le
(74) *Attorney, Agent, or Firm* — Pillsbury Winthrop Shaw Pittman LLP

(57) ABSTRACT

Methods, systems and programming for providing a personalized snippet are presented. In one example, a request is received for a snippet related to content to be provided to a user. A plurality of portions of the content is obtained. A first score is calculated for each of the plurality of portions based on information about of the user. One or more portions are selected from the plurality of portions based on the calculated first score. The snippet related to the content is created based on the selected one or more portions. The snippet is transmitted as a response to the request.

21 Claims, 15 Drawing Sheets

(56) References Cited

U.S. PATENT DOCUMENTS

| | | | |
|---|---|---|---|
| 2011/0282651 A1* | 11/2011 | Nygaard | G06F 17/30696 704/9 |
| 2011/0314007 A1* | 12/2011 | Dassa | G06F 17/30893 707/723 |
| 2012/0016875 A1* | 1/2012 | Jin | G06F 17/30867 707/734 |
| 2012/0215773 A1* | 8/2012 | Si | G06F 17/30864 707/723 |
| 2014/0280183 A1* | 9/2014 | Brown | G06F 17/30321 707/741 |
| 2014/0316890 A1* | 10/2014 | Kagan | G06Q 30/0256 705/14.54 |
| 2015/0066917 A1* | 3/2015 | Wang | G06F 17/30867 707/723 |
| 2015/0161130 A1* | 6/2015 | Liu | G06F 17/3053 707/723 |
| 2015/0178392 A1* | 6/2015 | Jockisch | G06F 17/30867 707/706 |

* cited by examiner

METHOD AND SYSTEM FOR PROVIDING A PERSONALIZED SNIPPET

TECHNICAL FIELD

The present teaching relates to methods, systems and programming for providing a snippet. Particularly, the present teaching is directed to methods, systems, and programming for providing a personalized snippet to a user.

BACKGROUND

The amount of information a person can access without much effort through the Internet can be overwhelming. Too much information can impede cognition and decision making, just like too little information can. The overwhelming amount of information tends to shorten the attention span to a particular piece of information because the cognitive power of a person did not significantly increase with the amount of accessible information the Internet made available. One effect of the shorter attention span is that a person tends to be more easily distracted. From the perspective of an Internet content provider, the distraction may be that a competitor draws away a person's attention. Therefore, catching a person's attention and generating interest within the shorter attention span helps to gain a competitive edge.

One way to achieve that is selecting and presenting a representative portion related to a content item to a person, in addition to the title of the content item. The representative portion may be referred as a snippet. For example, the snippet may be a portion that conveys the main idea of the content. In another example, in the context of a search, the snippet may be a portion that contains search terms the person used in the search.

Content presented in a browser or an app may be organized in a content stream. A content stream is a popular format especially for news, threads of discussion in online forums, and search results from a search engine. FIG. 1 (Prior Art) illustrates a typical content stream 130. References such as 110 to a series of content items (e.g., titles of a series of articles as hyperlinks) are presented as a list. Some or all of the references are followed by snippets such as 120 selected from or generated based on the content items. A thumbnail picture such as 140 may also be presented adjacent to some or all of the references.

The references and snippets may be selected from the content items. A typical reference to a content item is the title of the content item. A snippet for the content item may be the abstract, subtitle, or keywords of the content item. Due to the usually limited length of the references, the possibility of improving their effectiveness to catch a user's attention is limited. One common technique is to display words in the references as bold texts when those words are among search terms a user used to find the content items the references refer to. For example, in FIG. 2 (Prior Art), a user uses "winter olympics 2014" as a search term 230 to find articles on the Internet related to the Sochi Olympic Winter Games. A reference such as 210 in the content stream including references to articles found by a search engine may have words such as "2014" and "Olympic" displayed in bold because they are among the search terms. The same technique may be applied to snippets. For example, the words "2014," "Olympic" and "Winter" in snippet 220 are displayed in bold because they are among the search terms.

However, a search term does not always reflect a user's exact intent. For example, a user who searches with a search term "winter olympics 2014" may actually try to find results of a particular competition such as team ice dance. Even if the content item referred by the reference 210 actually includes some results of the team ice dance competition, without the results appearing in the snippet 220, the user has to access the content item to see the results. If the user is busy, he/she may navigate away from the content stream and miss the results.

While a snippet effective to catch one user's attention may not be so effective to catch another user's attention, existing techniques failed to take into consideration characteristics of the user to whom the snippet is selected to be presented. In addition, traditional systems for providing a snippet to a user did not provide a way to ascertain characteristics of the user or establish a link between the user's characteristics and what snippet is effective for her.

Therefore, there is a need to provide a solution for providing a personalized snippet to a user to avoid the above-mentioned drawbacks.

SUMMARY

The teachings disclosed herein relate to methods, systems, and programming for providing a personalized snippet to a user.

In one example, a method, implemented on a machine having at least one processor, storage, and a communication platform connected to a network for providing a personalized snippet is presented. A request is received via the communication platform for a snippet related to content to be provided to a user. A plurality of portions of the content is obtained. A first score is calculated for each of the plurality of portions based on information about of the user. One or more portions are selected from the plurality of portions based on the calculated first score. The snippet related to the content is created based on the selected one or more portions. The snippet is transmitted as a response to the request.

In another example, a system having at least one processor, storage, and a communication platform connected to a network for providing a personalized snippet is presented. The system comprises a snippet request analyzer, a content parsing unit, a user interest-based text ranking unit, a snippet generation unit, and a snippet transmitting unit. The snippet request analyzer is configured to receive, via the communication platform, a request for a snippet related to content to be provided to a user. The content parsing unit is configured to obtain a plurality of portions of the content. The user interest-based text ranking unit is configured to calculate, for each of the plurality of portions, a first score based on information about the user. The snippet generation unit is configured to select one or more portions from the plurality of portions based on the calculated first score and create the snippet related to the content based on the selected one or more portions. The snippet transmitting unit is configured to transmit the snippet as a response to the request.

Other concepts relate to software for providing a personalized snippet. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing a personalized snippet is presented. The recorded information, when read by the machine, causes the machine to perform the following. A request is received via the communication platform for a snippet related to content to be provided to a user. A plurality of portions of the content is obtained. A first score is calculated for each of the plurality of portions based on information about of the user. One or more portions are selected from the plurality of portions based on the calculated first score. The snippet related to the content is created based on the selected one or more portions. The snippet is transmitted as a response to the request.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
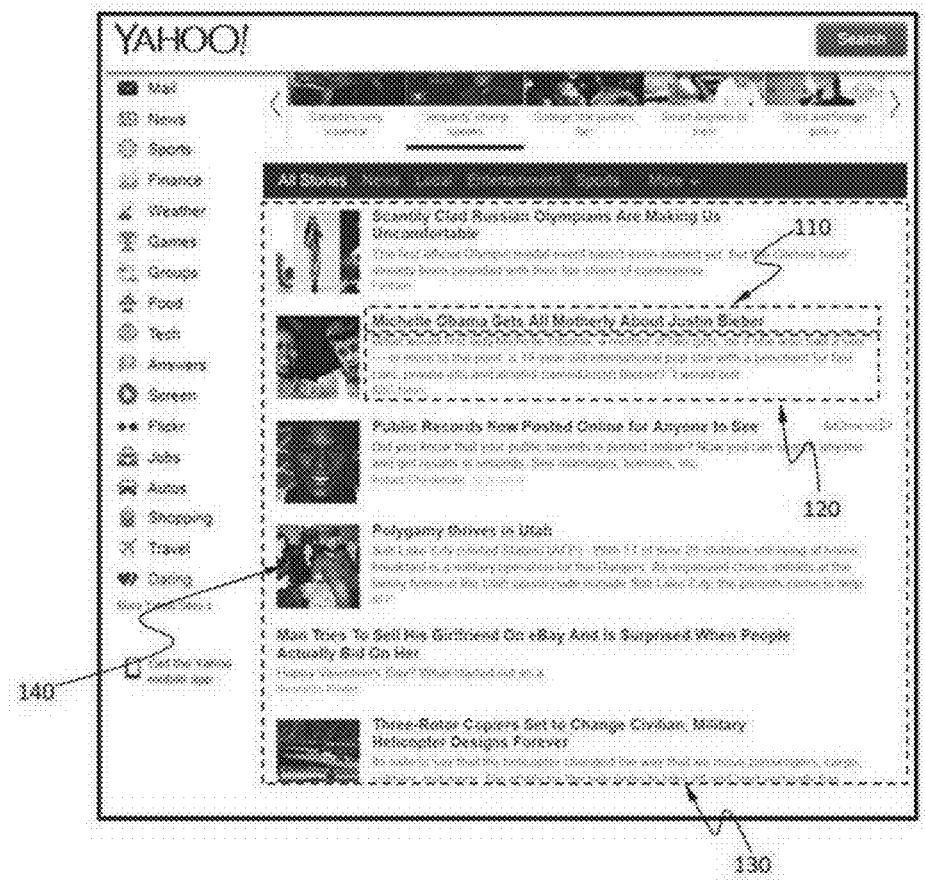
FIG. 1 illustrates a typical content stream.
Figure 2:
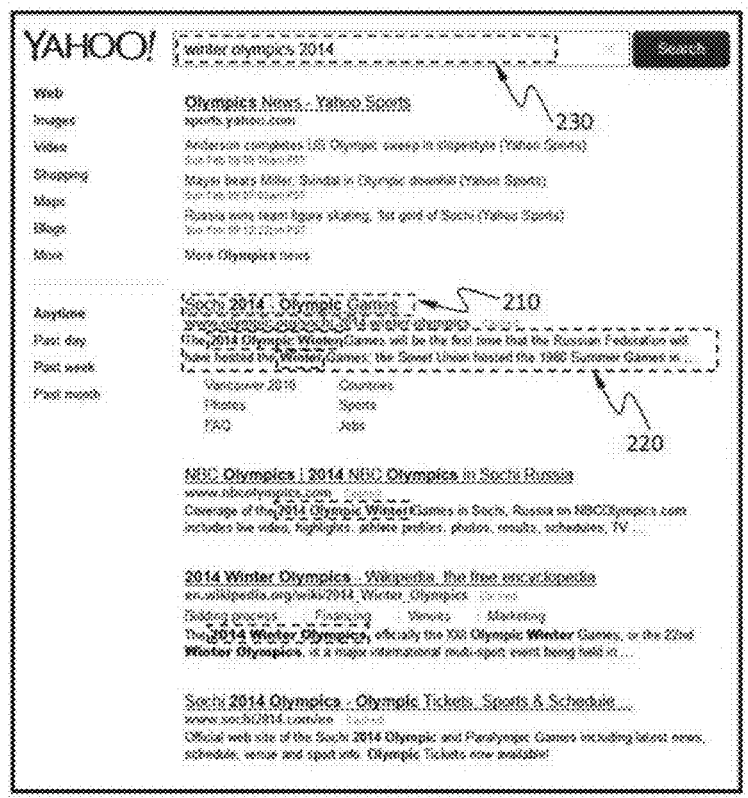
FIG. 2 illustrates a content stream with a snippet generated using a conventional method.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure describes method, system, and programming aspects of effectively and selectively providing a personalized snippet. Personalized snippet is especially beneficial to both an Internet content provider and the user who receives the content, in the era of mobile devices. Mobile devices, due to their smaller sizes, have limited amount of space available on a display. An article title alone often cannot provide readers sufficient information to lead them to click on a link to the article. Due to an unstructured nature of a content stream, the readers may question the quality of the stream without seeing the relevance between the perceived article content and their own interests.

Accordingly, a system in the present teaching generates a snippet for a user based on the user's interest to supplement or replace the article's title. For example, after a user sends a search request, an article is identified based on the search request. A snippet related to the article is generated and provided to the user with a reference to the article. To generate the snippet, the article may be parsed into a plurality of portions. Each portion is evaluated with the user's interest. In accordance with an embodiment of the present teaching, the evaluation of a portion may also be based on a descriptive power of the portion with respect to the article. Based on the evaluation of each portion, one or more portions are selected. A personalized snippet is generated based on the selected portions to take into account both the user's interest and relevance to the article.

In accordance with various embodiments of the present teaching, the user's interest can be obtained in an implicit way, e.g. through a user profile and/or a user interest profile mined from individual users and aggregated historical user behaviors. Therefore, no explicit user action is required. The system in the present teaching provides the users with sufficient hints and connections in the snippet so that the content in the snippet can resonate with the users quickly. In addition, the present teaching avoids displaying too much content so that it gives the user sufficient incentive to click open the article for further reading.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 3:
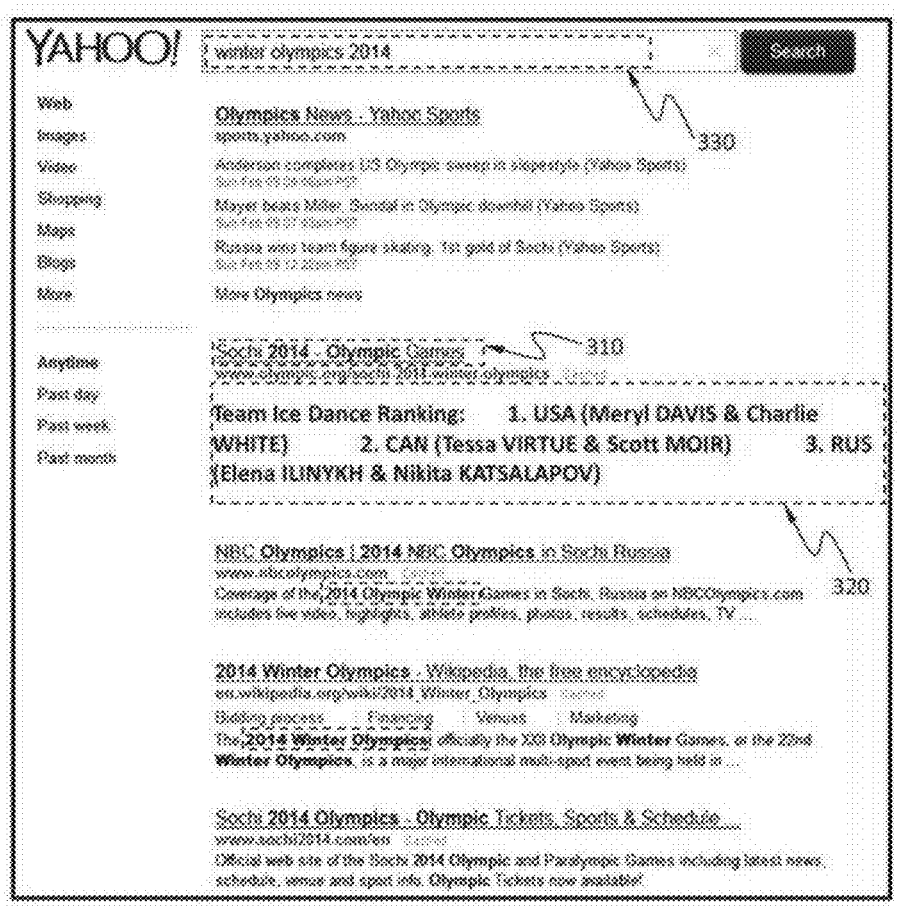
FIG. 3 illustrates an exemplary content stream, with snippets generated by a method or a system disclosed herein, according to an embodiment of the present teaching.

FIG. 3 illustrates an exemplary content stream, with snippets generated by a method or a system disclosed herein, according to an embodiment of the present teaching. In this example, a user searches with a search term "winter olympics 2014" 330 to find articles on the team ice dance competition. The method or the system may be configured to speculate that the user is likely to access a reference 310 if a snippet 320 showing the results of the team ice dance competition is presented to the user next to the reference 310. The speculation may be based on information including but not limited to: the search terms 330, information about the user, and characteristics of the article content. The information about the user may be obtained from one or more interests of the user based on a user profile and/or a user interest profile of the user. Characteristics of the article content may include one or more features of each of a plurality of portions of the article. With the results of the team ice dance competition appearing directly in the snippet, the user may grab the essential information he/she needs very quickly, and read more details by accessing the reference 310 if he/she wants.

It can be understood by one skilled in the art that the content stream in the present teaching is not limited to one-dimensional lists. For example, the titles in FIG. 3 may also be presented in a two-dimensional grid. The term "content" in the present teaching may include but is not limited to a news story, a webpage, a file hosted on a server. The references in the present teaching may be actionable representations, i.e., a representation that allows user interaction therewith. A content item in the present teaching may be a piece of content referred in a web page. It can be understood that a content item in a page may include a reference in the page linking to content outside the page. In the present teaching, a content item related to a topic may include a reference to some content related to a topic. After a content item in the present teaching is parsed into a plurality of pieces, each piece corresponds to a portion of the content item.

The references and snippets may be selected from the content items. A typical reference to a content item is the title of the content item. The references may also be other portions of the contents such as images, keywords, classification, date, authors, publisher, subject, etc. A snippet for the content item may be generated based on the abstract, subtitles, images, keywords, classification, date, authors, publisher, subject, a paragraph, etc.

Figure 4:
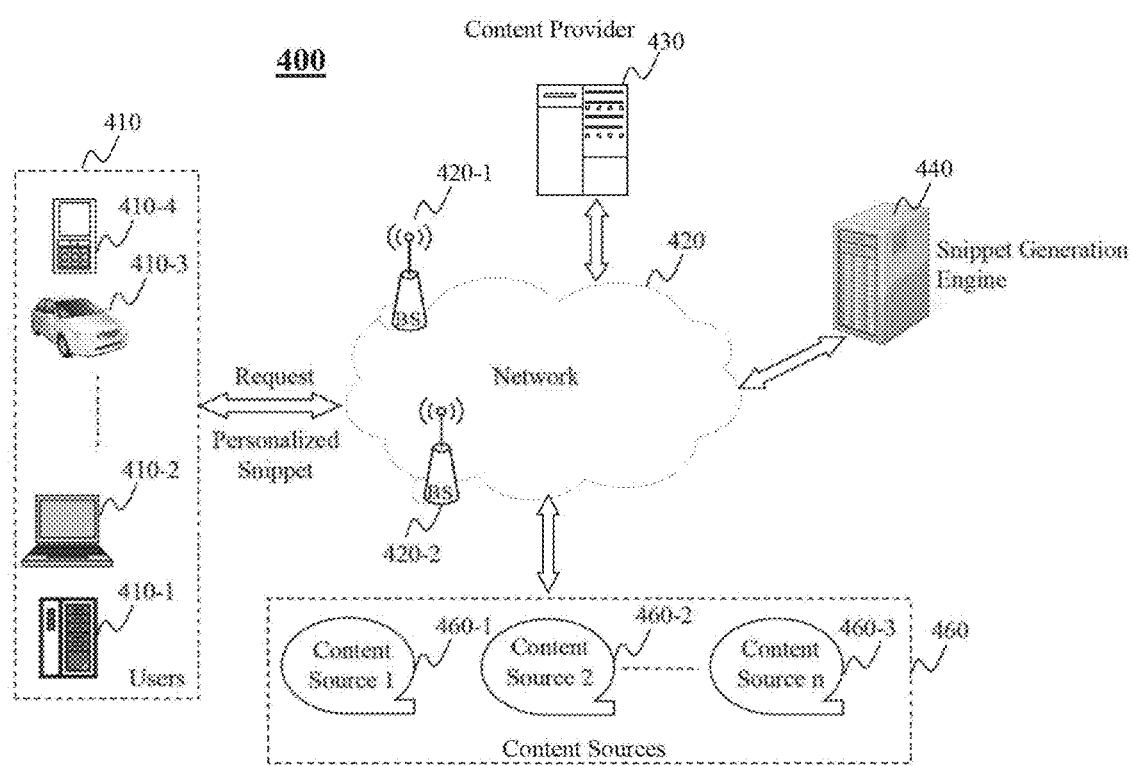
FIG. 4 is a high level depiction of an exemplary networked environment for providing a personalized snippet, according to an embodiment of the present teaching.

FIG. 4 is a high level depiction of an exemplary networked environment 400 for providing a personalized snippet, according to an embodiment of the present teaching. In FIG. 4, the exemplary networked environment 400 includes a content provider 430, a snippet generation engine 440, one or more users 410, a network 420, and content sources 460. The network 420 may be a single network or a combination of different networks. For example, the network 420 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 420 may be an online advertising network or ad network that is a company connecting advertisers to web sites that want to host advertisements. A key function of an ad network is aggregation of ad space supply from publishers and matching it with advertiser demand. The network 420 may also include various network access points, e.g., wired or wireless access points such as base stations or Internet exchange points 420-1 . . . 420-2, through which a data source may connect to the network 420 in order to transmit information via the network 420.

Users 410 may be of different types such as users connected to the network 420 via desktop computers 410-1, laptop computers 410-2, a built-in device in a motor vehicle 410-3, or a mobile device 410-4. A user 410 may send a request to the content provider 430 via the network 420 and receive a response to the request from the content provider 430. The content provider 430 may be a publisher or a search engine that can provide content based on the request. The response may include the content and a personalized snippet related to the content.

The snippet generation engine 440 can help the content provider 430 to generate a personalized snippet, based on the user's characteristics and/or historical interest(s). In this embodiment, the snippet generation engine 440 directly connects to the network 420 and can communicate with the users 410 directly via the network 420.

The content sources 460 include multiple content sources 460-1, 460-2 . . . 460-3, such as vertical content sources. A content item source 460 may correspond to a website hosted by an entity, whether an individual, a business, or an organization such as USPTO.gov, a content item provider such as cnn.com and Yahoo.com, a social network website such as Facebook.com, or a content feed source such as tweeter or blogs. The content provider 430 and the snippet generation engine 440 may access information from any of the content sources 460-1, 460-2 . . . 460-3. For example, the content provider 430 may fetch content, e.g., websites, through its web crawler to build a web page.

Figure 5:
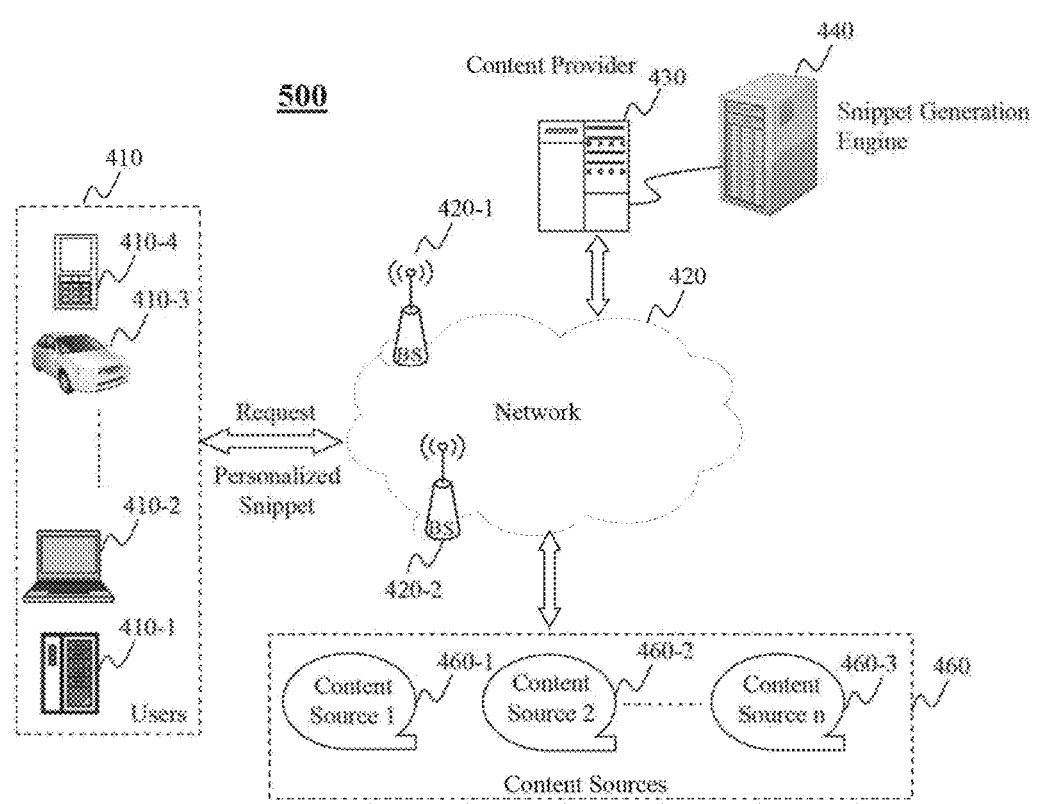
FIG. 5 is a high level depiction of another exemplary networked environment for providing a personalized snippet, according to an embodiment of the present teaching.

FIG. 5 is a high level depiction of another exemplary networked environment 500 for providing a personalized snippet, according to an embodiment of the present teaching. The exemplary networked environment 500 in this embodiment is similar to the exemplary networked environment 400 in FIG. 4, except that the snippet generation engine 440 in this embodiment connects to the network 420 via the content provider 430. For example, the snippet generation engine 440 may serve as a backend of the content provider 430 to generate a personalized snippet to be presented to a user communicating with the content provider 430.

Figure 6:
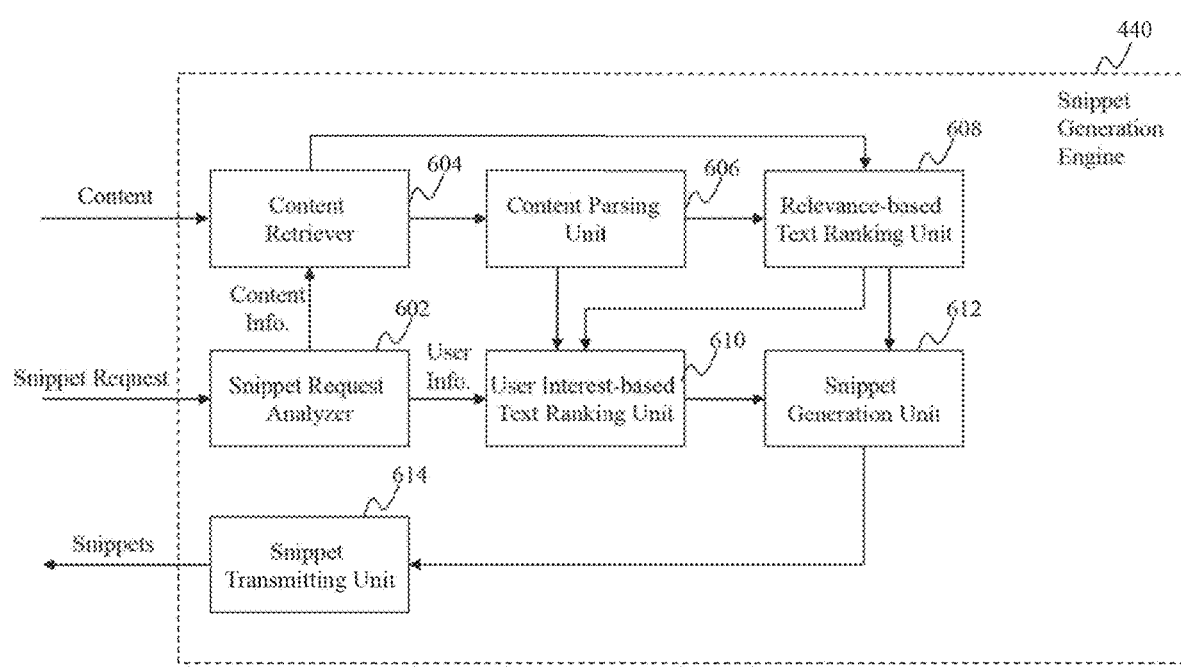
FIG. 6 illustrates an exemplary diagram of a snippet generation engine for providing a personalized snippet, according to an embodiment of the present teaching.

FIG. 6 illustrates an exemplary diagram of a snippet generation engine 440 for providing a personalized snippet, according to an embodiment of the present teaching. The snippet generation engine 440 may be in an exemplary networked environment, e.g., the networked environment 400 in FIG. 4 or the networked environment 500 in FIG. 5. The snippet generation engine 440 in this example includes a snippet request analyzer 602, a content retriever 604, a content parsing unit 606, a relevance-based text ranking unit 608, a user interest-based text ranking unit 610, a snippet generation unit 612, and a snippet transmitting unit 614. The snippet generation engine 440 in this example receives a snippet request and generates a personalized snippet to be provided to a user. The snippet request may be received from a user 410 directly or from the content provider 430. The personalized snippet may be provided to the user 410 directly or via the content provider 430.

The snippet request analyzer 602 in this example receives and analyzes the snippet request for a snippet related to a content item. The content item may be a content item in a web page to be provided to the user or a content item in a search result in response to the user's search query. Based on analysis at the snippet request analyzer 602, the snippet request analyzer 602 may obtain and send content information related to the snippet request to the content retriever 604; and obtain and send user information related to the snippet request to the user interest-based text ranking unit 610.

The content retriever 604 in this example retrieves the content item based on the content information related to the snippet request, e.g. from one or more content sources 460. For example, when the user searches with a search term "basketball", the content item may be an article related to "basketball." The content retriever 604 may also extract one or more features from the article, where the one or more features represent a topic or subject related to the article. The content retriever 604 may send the article to the content parsing unit 606 for parsing the article, send the one or more features of the article to the relevance-based text ranking unit 608 for generating a relevance-based text ranking list, and send the one or more features of the article to the user interest-based text ranking unit 610 for generating a user interest-based text ranking list.

The content parsing unit 606 in this example receives the content item, e.g. the article, from the content retriever 604 and parses the article into a plurality of text pieces. Each piece may include one or more sentences of the article. In one embodiment, a piece may be a portion of the article or a portion of a sentence in the article.

The relevance-based text ranking unit 608 in this example receives the plurality of parsed pieces (portions) of the content item from the content parsing unit 606 and determines feature(s) for each portion. The relevance-based text ranking unit 608 also receives feature(s) representing the entire content item from the content retriever 604. The relevance-based text ranking unit 608 thus may compare the feature(s) of each portion with feature(s) of the entire content item to generate a score representing a descriptive power of the portion with respect to the content item. The relevance-based text ranking unit 608 may thus generate a relevance-based text ranking list of the portions, based on the scores of the portions. For example, the top portion in the list is a portion having highest score and highest descriptive power with respect to the content item, e.g., a portion that can best represent a topic related to the article.

It can be understood that the process of generating a relevance-based text ranking list for a content item may be performed offline and before the user sends the request. For example, calculating the relevance-based score at the relevance-based text ranking unit 608 may be carried out by using a supervised learning model. A supervised learning model attempts to generalize a function or mapping from inputs to outputs which can then be used speculatively to generate an output for previously unseen inputs. A supervised learning model is trained on labeled examples, i.e., input where the desired output is known. Each labeled example may be a pair consisting of an input object (typically a vector) and a desired output value (also called the supervisory signal). The supervised learning model can be trained offline before the user request is received. In another example, the entire process for generating a relevance-based text ranking list for the content item can be performed offline before serving a user, because the process does not need any user input.

In one embodiment, the relevance-based text ranking unit 608 may send the relevance-based text ranking list to the snippet generation unit 612 for generating a snippet. In another embodiment, the relevance-based text ranking unit 608 may also send the relevance-based text ranking list to the user interest-based text ranking unit 610 for generating a user interest-based text ranking list.

The user interest-based text ranking unit 610 in this example receives user information from the snippet request analyzer 602, parsed pieces (portions) of the content item from the content parsing unit 606, and/or the relevance-based text ranking list from the relevance-based text ranking unit 608. The user interest-based text ranking unit 610 may retrieve a user profile of the user based on the user information and determine the user's interest based on the user profile. The user's interest may include feature(s) or topic(s) interesting to the user. The user interest-based text ranking unit 610 may obtain feature(s) of each portion and compare the features of each portion with features of the user's interest. A user interest score can be determined from each comparison, e.g. based on a similarity between features of each portion and features of the user's interest.

In one embodiment, the user interest score may be determined based on the relevance-based text ranking list. For example, the user interest-based text ranking unit 610 may start from the top portion down in the relevance-based text ranking list, and determine the first portion of text that has a user interest score higher than a predetermined threshold. Thus, the user interest-based text ranking unit 610 may quickly find a piece of text that is interesting to the user and can represent well enough the essence of the content item.

In general, the user interest-based text ranking unit 610 may generate a user interest-based text ranking list based on the user interest scores of the portions and send the user interest-based text ranking list to the snippet generation unit 612.

The snippet generation unit 612 in this example receives the relevance-based text ranking list from the relevance-based text ranking unit 608 and the user interest-based text ranking list from the user interest-based text ranking unit 610. The snippet generation unit 612 may generate a snippet related to the content item based on the two lists. For example, the snippet generation unit 612 may first select one or more portions based on the two lists. The snippet generation unit 612 may modify the texts in the selected portions based on knowledge and grammar, if the texts are too long or too short. The snippet generation unit 612 may then generate a snippet based on the texts to represent the content item and the user's personal interest. Compared to conventional snippet, the personalized snippet generated by the snippet generation unit 612 increases a likelihood that the user will follow a reference to the content item. The personalized snippet is sent from the snippet generation unit 612 to the snippet transmitting unit 614. The snippet transmitting unit 614 in this example transmits the personalized snippet to the user, either directly or via a content provider.

Figure 7:
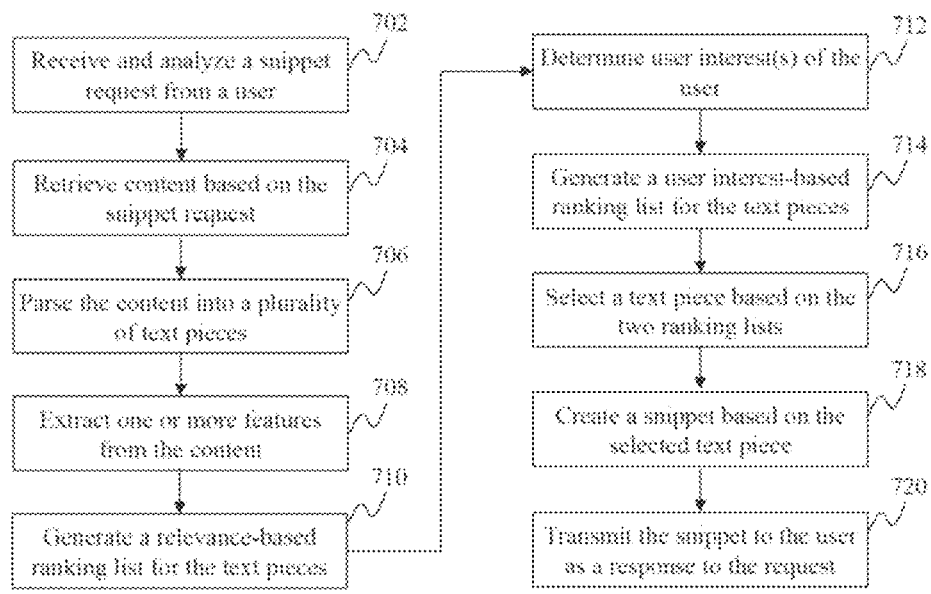
FIG. 7 is a flowchart of an exemplary process performed by a snippet generation engine, according to an embodiment of the present teaching.

FIG. 7 is a flowchart of an exemplary process performed by a snippet generation engine, according to an embodiment of the present teaching. In one example, the exemplary process in FIG. 7 may be performed by the snippet generation engine 440 shown in FIG. 6. Starting at 702, a snippet request from a user is received and analyzed. At 704, content is retrieved based on the snippet request. At 706, the content is parsed into a plurality of text pieces or text portions. At 708, one or more features are extracted from the content. At 710, a relevance-based text ranking list is generated regarding the text portions.

At 712, information about the user, e.g. user interest(s) of the user, is determined. At 714, a user interest-based text ranking list is generated for the text portions, e.g. based on the information about the user and/or the relevance-based text ranking list. At 716, one or more text portions are selected from the two ranking lists. At 718, a snippet is generated based on the selected text portion(s). At 720, the snippet is transmitted to the user as a response to the request.

Figure 8:
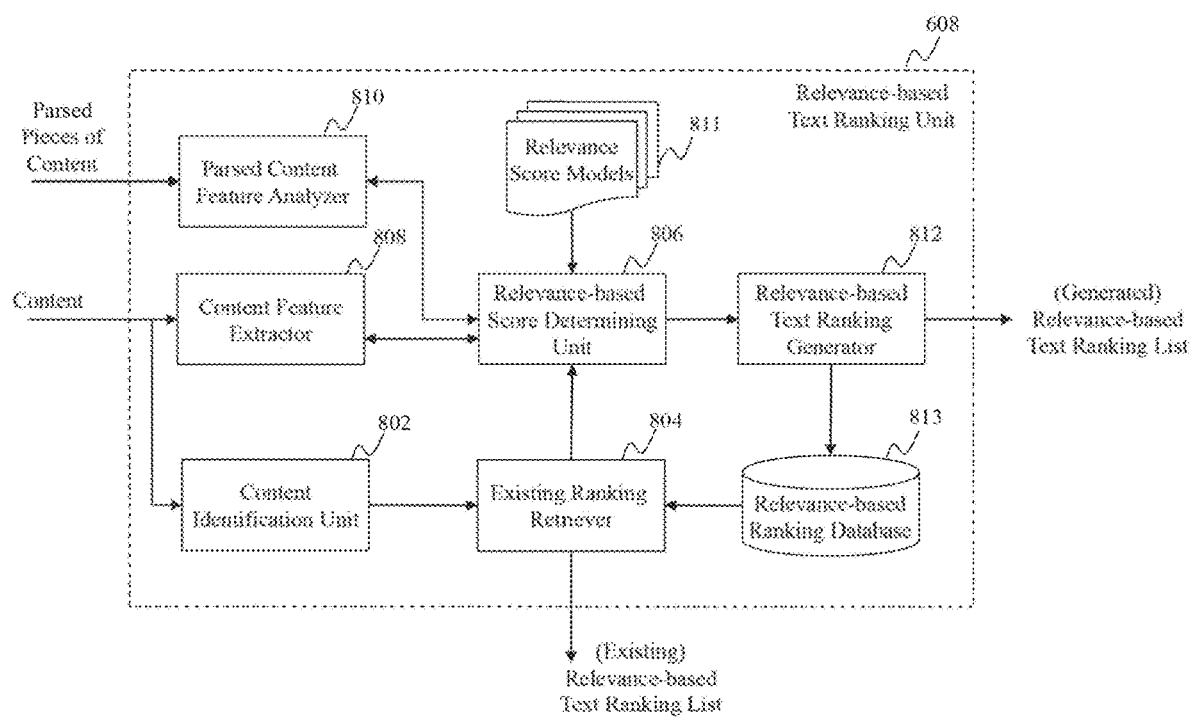
FIG. 8 illustrates an exemplary diagram of a relevance-based text ranking unit in a snippet generation engine, according to an embodiment of the present teaching.

FIG. 8 illustrates an exemplary diagram of a relevance-based text ranking unit 608 in a snippet generation engine, e.g. the snippet generation engine 440, according to an embodiment of the present teaching. The relevance-based text ranking unit 608 in this example includes a content identification unit 802, an existing ranking retriever 804, a relevance-based score determining unit 806, a content feature extractor 808, a parsed content feature analyzer 810, and a relevance-based text ranking generator 812.

The content identification unit 802 in this example receives the content item from the content retriever 604 and identifies the content item. For example, the content identification unit 802 can determine a content identification (ID) for the content item, where the content ID may be a content index for retrieving information related to the content item. The content ID may be sent to the existing ranking retriever 804.

The existing ranking retriever 804 in this example receives the content ID for the content item from the content identification unit 802 and determines whether there is an existing relevance-based text ranking list for the content item. In one example, the existing ranking retriever 804 determines that there is an existing relevance-based text ranking list for the content item, e.g. stored in a relevance-based ranking database 813 in the relevance-based text ranking unit 608. The relevance-based ranking database 813 may store one or more relevance-based text ranking lists previously generated by the relevance-based text ranking generator 812. In this situation, the existing ranking retriever 804 may retrieve the existing relevance-based text ranking list for the content item and send the list to the snippet generation unit 612 and/or the user interest-based text ranking unit 610. In another example, the existing ranking retriever 804 determines that there is not any existing relevance-based text ranking list for the content item stored in the relevance-based ranking database 813. Then, the existing ranking retriever 804 may inform the relevance-based score determining unit 806 that a new relevance-based text ranking list is needed for the content item.

The relevance-based score determining unit 806 in this example receives information from the existing ranking retriever 804 about generating a relevance-based text ranking list for a content item. Upon receiving the information, the relevance-based score determining unit 806 may request information from the content feature extractor 808 and the parsed content feature analyzer 810. The content feature extractor 808 in this example receives the content item, e.g. an article regarding which a snippet is to be generated, from the content retriever 604, and extracts one or more features from the content item. The parsed content feature analyzer 810 in this example receives parsed pieces (portions) of the content item from the content parsing unit 606, and analyzes the portions to obtain feature(s) of each text portion of the content item. In one embodiment, both the content feature extractor 808 and the parsed content feature analyzer 810 will wait for a request from the relevance-based score determining unit 806 to start to perform their respective functionalities. In another embodiment, the content feature extractor 808 and/or the parsed content feature analyzer 810 may proactively perform their respective functionalities before receiving a request from the relevance-based score determining unit 806.

In response to the request from the relevance-based score determining unit 806, the content feature extractor 808 may send the extracted features of the content item to the relevance-based score determining unit 806, and the parsed content feature analyzer 810 may send the features of each portion of the content item to the relevance-based score determining unit 806. The relevance-based score determining unit 806 may then select one of a plurality of relevance score models 811 stored in the relevance-based text ranking unit 608, and determine a relevance-based score for each portion of the content item based on the selected model.

A relevance score model determines how to calculate a relevance-based score with respect to a portion of the content item. For example, a relevance score model used to calculate a relevance-based score for a text portion may be based on at least one of following information with respect to the portion: length, position, similarity to a title, containment of name entities, and keywords or categories of the content in the portion. Different relevance score models may have different weights on the information with respect to a text portion.

A relevance score model for calculating the relevance-based score at the relevance-based score determining unit 806 may be a supervised learning model that is trained on labeled examples, i.e., input where the desired output is known. Each labeled example may be a pair consisting of an input object (typically a vector) and a desired output value (also called the supervisory signal). In this example, it is possible to train the supervised learning model at 806 using labeled examples of text portions, using the quality of the texts summarizing the content item as an optimization target. For example, a plurality of text portions of an article are used to train a relevance score model 811, where the quality of each text portion is known regarding how well the text portion can summarize the article. The supervised learning model may be probabilistic—it infers a probability of an output conditioned on an input.

The relevance-based score determining unit 806 may select a relevance score model 811 based on a topic of the content item and then calculate a relevance-based score for each portion of the content item according to the selected relevance score model 811. The relevance-based score determining unit 806 may send the relevance-based scores to the relevance-based text ranking generator 812 for generating a relevance-based text ranking list.

The relevance-based text ranking generator 812 in this example receives the relevance-based scores from the relevance-based score determining unit 806 and generate the relevance-based text ranking list for the portions according to the scores. For example, the relevance-based text ranking list includes all portions listed top down from a portion having the highest score to a portion having the lowest score, i.e. from a portion having most descriptive power of the content item to a portion having least descriptive power of the content item. The relevance-based score determining unit 806 may send the generated relevance-based text ranking list to the relevance-based ranking database 813 to be stored for future use, and to the user interest-based text ranking unit 610 and/or the snippet generation unit 612 as described before. It can be understood that in each situation, whether there is an existing relevance-based text ranking list or not, the relevance-based text ranking unit 608 may only generate and output one relevance-based text ranking list. If there is an existing relevance-based text ranking list, what the user interest-based text ranking unit 610 and the snippet generation unit 612 receives from the relevance-based text ranking unit 608 is the existing relevance-based text ranking list. If there is not an existing relevance-based text ranking list, what the user interest-based text ranking unit 610 and the snippet generation unit 612 receives from the relevance-based text ranking unit 608 is the generated relevance-based text ranking list. The user interest-based text ranking unit 610 and the snippet generation unit 612 do not have to know whether the relevance-based text ranking list is pre-existing or newly generated.

Figure 9:
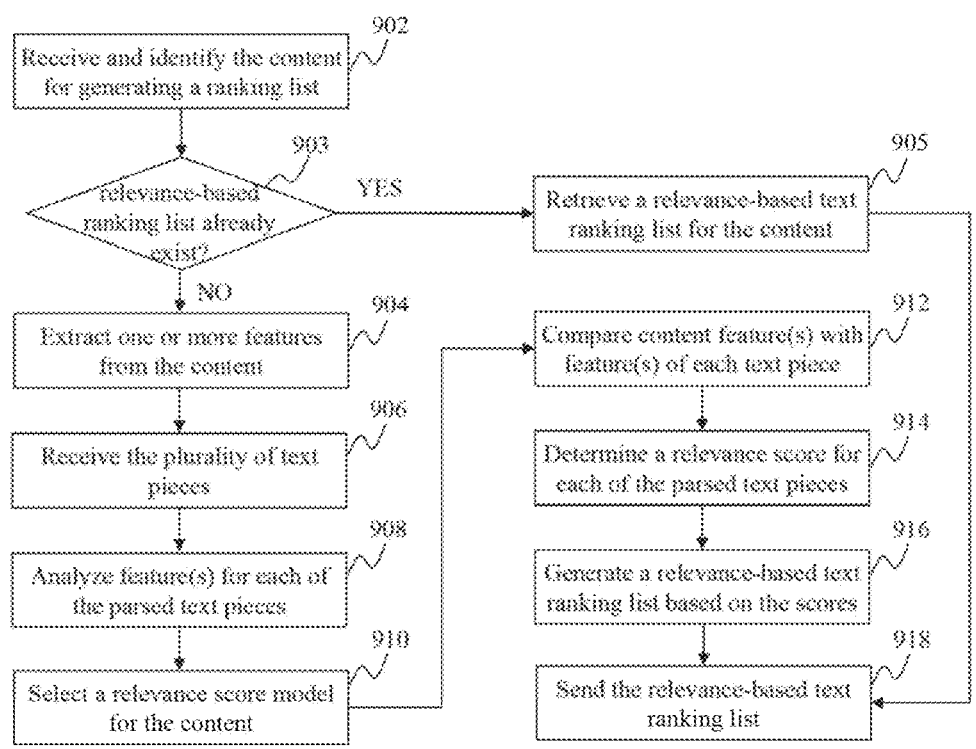
FIG. 9 is a flowchart of an exemplary process performed by a relevance-based text ranking unit, according to an embodiment of the present teaching.

FIG. 9 is a flowchart of an exemplary process performed by a relevance-based text ranking unit, e.g. the relevance-based text ranking unit 608 in FIG. 8, according to an embodiment of the present teaching. Starting at 902, the content is received and identified for generating/obtaining a relevance-based text ranking list. At 903, it is checked whether a relevance-based text ranking list already exists for the content. If so, at 905, the existing relevance-based text ranking list is retrieved for the content, and the process goes to 918 directly. Otherwise, at 904, one or more features are extracted from the content, and the process moves on to 906.

At 906, the plurality of parsed text pieces of the content is received. At 908, feature(s) for each of the parsed text pieces are analyzed and obtained. At 910, a relevance score model is selected for the content. At 912, content feature(s) are compared with feature(s) of each text piece/portion. At 914, a relevance score is determined for each text portion, e.g. based on a degree of similarity between the features of the text portion and the features representing a topic of the content. At 916, a relevance-based text ranking list including the text portions is generated based on the scores of the text portions. At 918, the relevance-based text ranking list is sent, e.g. to the user interest-based text ranking unit 610 and/or the snippet generation unit 612.

Figure 10:
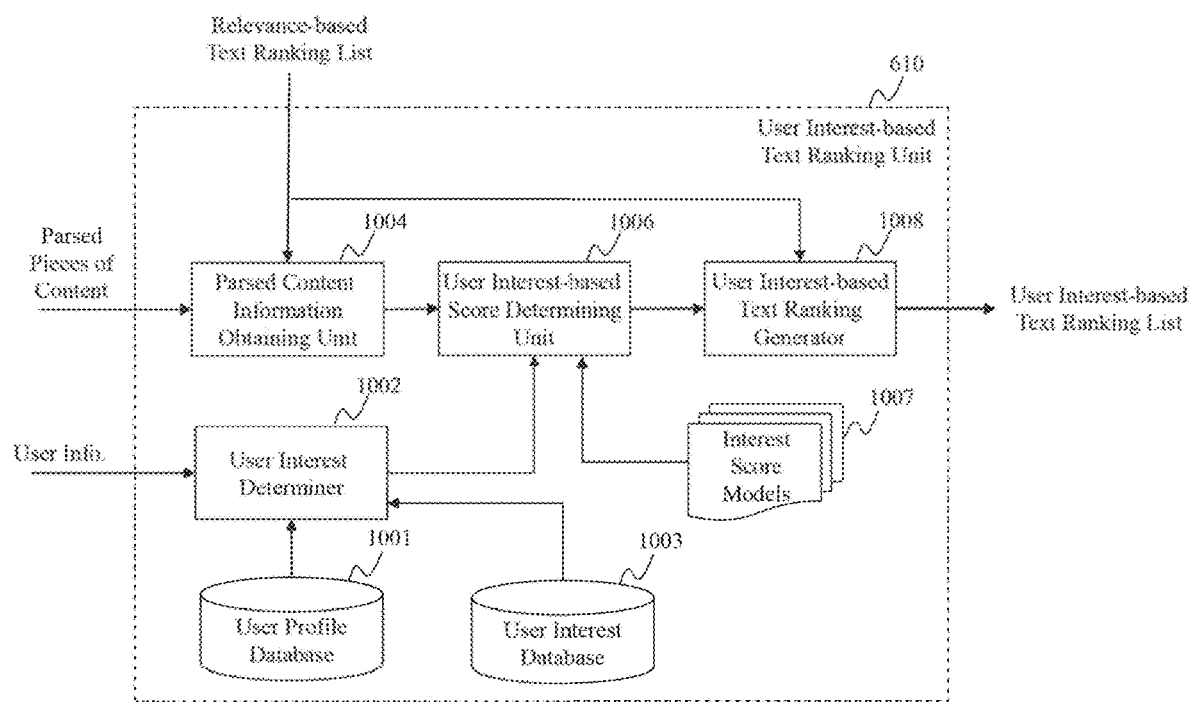
FIG. 10 illustrates an exemplary diagram of a user interest-based text ranking unit in a snippet generation engine, according to an embodiment of the present teaching.

FIG. 10 illustrates an exemplary diagram of a user interest-based text ranking unit 610 in a snippet generation engine, e.g. the snippet generation engine 440, according to an embodiment of the present teaching. The user interest-based text ranking unit 610 in this example includes a user interest determiner 1002, a parsed content information obtaining unit 1004, a user interest-based score determining unit 1006, and a user interest-based text ranking generator 1008.

The user interest determiner 1002 in this example receives user information about the user to whom the snippet will be provided. The user interest determiner 1002 may determine a user ID of the user, retrieve a user profile from a user profile database 1001 in the user interest-based text ranking unit 610 according to the user ID, and retrieve a user interest profile from a user interest database 1003 in the user interest-based text ranking unit 610 according to the user ID.

The user profile database 1001 in this example may store user profiles of different users 410. A user profile may include but not limited to demographic information, e.g. name, sex, age, location, etc. which is either explicitly input by the user during registration or implicitly deduced based on the user's behavior online, e.g. email communications, online blog posts, online chatting, or online post in an online social network regarding the user.

The user interest database 1003 in this example may store user interest profiles for different users 410. A user interest profile may include information regarding the user's interest determined on either explicit input from the user or implicit predictions of the system. The explicit input may include the user's bookmarking or annotation of a particular article. The implicit prediction may be based on the user's behavior regarding an article related to a topic. For example, if the user has many actions during reading the article, including but not limited to clicking, scrolling, zooming, and pressing, the user may be predicted to be implicitly interested in the article and/or the topic. In another example, a long dwelling time on an article may also implicitly indicate the user's interest on the article or some features/portions of the article. In yet another example, if a friend of or a person having close relationship with the user in an online social is determined to be interested in a topic, it can be predicted implicitly that the user also has some interest in the topic. In still another example, if there are statistics showing that people with an age above 60 have a high interest in topics about "moving to Florida," and the user sending the request has an age above 60, it can be determined implicitly that the user has some interest in topics like "moving to Florida." These explicit and implicit user interests can be compiled in the user interest profile of the user.

Based on the user profile and/or the user interest profile, the user interest determiner 1002 may determine or predict personal interest(s) of the user. The user interest determiner 1002 may then send the user interests to the user interest-based score determining unit 1006 for determining a user interest-based score for each portion of the content item to be provided to the user.

The parsed content information obtaining unit 1004 in this example obtains information about each of the parsed text pieces, i.e. each portion of the content item to be provided to the user e.g. via a reference. To generate a snippet related to the content item in addition to the reference, the content item has been parsed into text pieces. In one embodiment, a relevance-based text ranking list of the parsed portions has been generated and sent to the user interest-based text ranking unit 610. In this situation, the parsed content information obtaining unit 1004 receives the relevance-based text ranking list, combines the ranking list with other information related to the content item including e.g. feature(s) for each portion based on an analysis performed at the parsed content information obtaining unit 1004, and send the combined information to the user interest-based score determining unit 1006. In another embodiment, the parsed content information obtaining unit 1004 does not receive the relevance-based text ranking list of the parsed portions. In this situation, analyzes parsed portions of the content item to obtain feature(s) for each portion and send the features to the user interest-based score determining unit 1006.

The user interest-based score determining unit 1006 in this example selects one of a plurality of interest score models 1007 stored in the user interest-based text ranking unit 610 for the user and the content, and determines a user interest-based score for each parsed text piece. An interest score model 1007 determines a way to calculate the user interest-based score with respect to each portion of the content item. For example, an interest score model 1007 used to calculate a user interest-based score for a text portion may be based on at least one of following information with respect to the user: demographic information of the user, the user's bookmarking or annotation, online historical behaviors of the user, e.g. email communications, online blog posts, online chatting, or online post in an online social network regarding the user. Different interest score models 1007 may have different weights on the above mentioned information with respect to the user.

An interest score model 1007 for calculating the user interest-based score at the user interest-based score determining unit 1006 may be a supervised learning model that is trained on labeled examples, i.e., input where the desired output is known. Each labeled example may be a pair consisting of an input object (typically a vector) and a desired output value (also called the supervisory signal). In this example, it is possible to train the supervised learning model at 1006 using labeled examples including characteristics of this particular user to whom the content will be provided and/or the above mentioned information with respect to the user. Sometimes, characteristics of this particular user may not be available or may not be detailed. For example, certain characteristics of this particular user such gender, age, income, spending habits, and history of content access (e.g., past reading behavior, past exploration pattern for a subject similar to the subject of the first content item, session time) may be unknown. The supervised learning model may be trained using labeled examples including only the available characteristics (e.g., the coarse location of this particular user because it is almost always determinable from the IP address, phone number, access to mobile access point (e.g., Wi-Fi hotspot, mobile network base station)), or using labeled examples including characteristics of other users similar to this particular user (e.g., in terms of having near coarse location with this particular user, having the same gender, similar age, similar income). The supervised learning model may be probabilistic—it infers a probability of an output (e.g., the probability this particular user is interested in the additional content items) conditioned on an input (e.g., the characteristics of this particular user and the characteristics of the first content item).

In one embodiment, the supervised learning model at 1007 may be trained using the user's explicit confirmation of interest in an article as an optimization target. For example, a plurality of text portions of an article are used to train an interest score model 1007, where it is known, for each text portion, whether the user is interested in the text portion based on the user's explicit confirmation, e.g. answer to questions or bookmarking. This process may be performed offline and before serving the user.

In another embodiment, the supervised learning model at 1007 may be trained using some implicit information as an optimization target, where the implicit information is about the user with respect to the user's interest in an article. For example, a plurality of text portions of an article are used to train an interest score model 1007, where it is known, for each text portion, whether the user is interested in the text portion based on some implicit information, e.g. the user's online behaviors regarding articles of a similar topic, or explicit interest expressed by a friend or a connecter of the user in a social network. In this situation, the supervised learning model at 1007 may be updated dynamically during the process of serving the user with personalized snippets.

In yet another embodiment, the supervised learning model at 1007 may be trained using a likelihood as an optimization target, where the likelihood represents how likely the user will follow a reference to the content if the snippet includes the portion. For example, a plurality of text portions of an article are used to train an interest score model 1007, where it is known, for each text portion, how likely the user will follow a reference to the text portion, e.g. based on a historical percentage of times the user has followed the reference when the snippet includes the portion. In this situation, the supervised learning model at 1007 may be either performed offline before serving the user or updated dynamically during the process of serving the user with personalized snippets.

The user interest-based score determining unit 1006 may select an interest score model 1007 based on the user's profile or historical records, e.g. which model better predicted the user's interest in the history based on the user's confirmation or behavior after the model is used. According to the selected interest score model 1007, the user interest-based score determining unit 1006 determines a user interest-based score for each portion, based on the user interests of the user and the information about each portion received from the parsed content information obtaining unit 1004. The user interest-based score determining unit 1006 may send the user interest-based scores to the user interest-based text ranking generator 1008 for generating a user interest-based text ranking list.

The user interest-based text ranking generator 1008 in this example receives the user interest-based scores from the user interest-based score determining unit 1006 and generates a user interest-based text ranking list including the plurality of portions of the content item to be provided to the user, based on the user interest-based scores. In one embodiment, the user interest-based text ranking unit 610 does not receive a relevance-based text ranking list when the user interest-based text ranking list is generated. In this case, the user interest-based text ranking list may include all portions listed top down from a portion having the highest user interest-based score to a portion having the lowest user interest-based score, i.e. from a portion that is most attractive to the user to a portion that is least attractive to the user. In another embodiment, the user interest-based text ranking unit 610 receives a relevance-based text ranking list when the user interest-based text ranking list is generated. In this case, the user interest-based text ranking list may be generated based on the relevance-based text ranking list. For example, from top down in the relevance-based text ranking list, the user interest-based text ranking generator 1008 finds a top one portion that meets a predetermined threshold regarding the user's interest, e.g. at least one matching keyword, or named entity, or category in the user's interest profile. The user interest-based text ranking generator 1008 lists the top one as the first in the user interest-based text ranking list. Then, from top down in the relevance-based text ranking list, the user interest-based text ranking generator 1008 finds a second one that meets the predetermined threshold, and lists the second one as the second in the user interest-based text ranking list. This process goes on to the end of the relevance-based text ranking list. Then, the user interest-based text ranking generator 1008 may list the rest portions that did not meet the predetermined threshold at the end of the user interest-based text ranking list, according to the same order as they were in the relevance-based text ranking list. In either embodiment, the user interest-based text ranking generator 1008 may send the generated user interest-based text ranking list to the snippet generation unit 612 for generating the personalized snippet.

Figure 11:
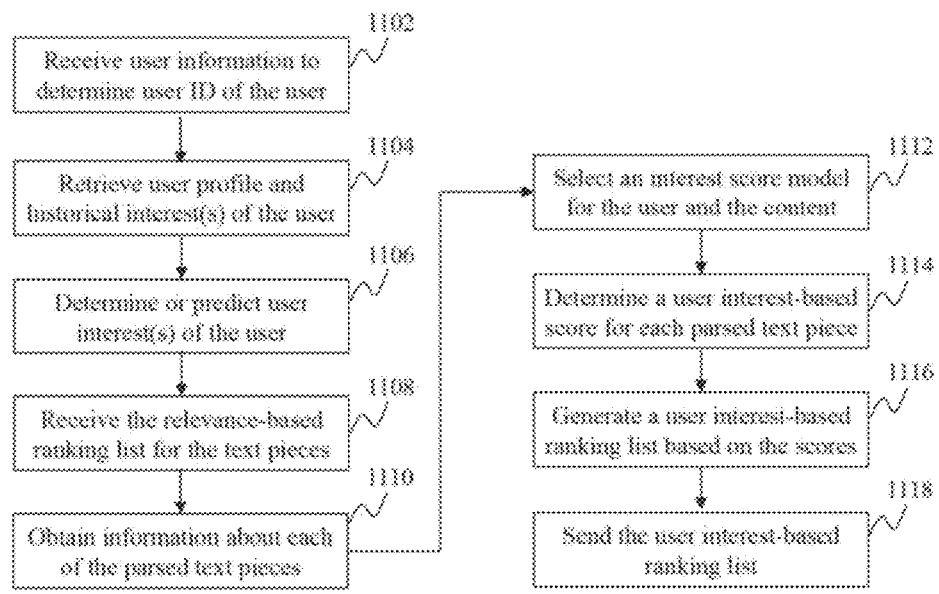
FIG. 11 is a flowchart of an exemplary process performed by a user interest-based text ranking unit, according to an embodiment of the present teaching.

FIG. 11 is a flowchart of an exemplary process performed by a user interest-based text ranking unit, e.g. the user interest-based text ranking unit 610 in FIG. 10, according to an embodiment of the present teaching. Starting from 1102, user information is received to determine user ID of the user. At 1104, a user profile and/or historical interest(s) of the user are retrieved, e.g. based on the user ID. At 1106, user interest(s) of the user are determined or predicted. Optionally at 1108, a relevance-based ranking list for the text portions of the content item is received. At 1110, information about each of the parsed text portions is obtained.

At 1112, an interest score model is selected for the user and the content. At 1114, a user interest-based score is determined for each parsed text piece based on the selected interest score model. At 1116, a user interest-based ranking list is generated based on the user interest-based scores. At 1118, the user interest-based ranking list is sent, e.g. to the snippet generation unit 612 for generating a personalized snippet.

Figure 12:
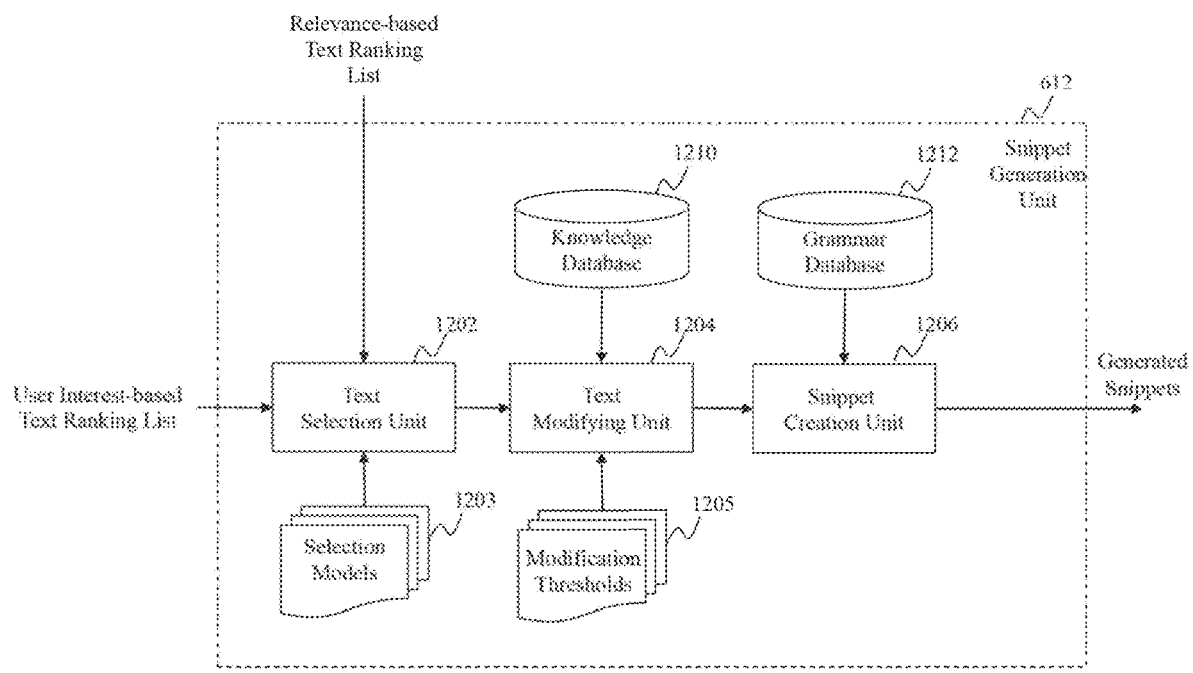
FIG. 12 illustrates an exemplary diagram of a snippet generation unit in a snippet generation engine, according to an embodiment of the present teaching.

FIG. 12 illustrates an exemplary diagram of a snippet generation unit 612 in a snippet generation engine, e.g. the snippet generation engine 440, according to an embodiment of the present teaching. The snippet generation unit 612 in this example includes a text selection unit 1202, a text modifying unit 1204, and a snippet creation unit 1206.

The text selection unit 1202 in this example receives a relevance-based text ranking list from the relevance-based text ranking unit 608 and a user interest-based text ranking list from the user interest-based text ranking unit 610. Based on the two ranking lists, the text selection unit 1202 selects one or more text portions, using one of a plurality of selection models 1203 stored in the snippet generation unit 612. A selection model 1203 determines how to select a text portion from the two ranking list. According to an exemplary selection model, the text selection unit 1202 searches from top down the relevance-based text ranking list to find the first one or more text portions each of which having a user interest-based score higher than a predetermined threshold or the first one or more text portions being ranked higher than a predetermined threshold in the user interest-based text ranking list. According to another exemplary selection model, the text selection unit 1202 searches from top down the user interest-based text ranking list to find the first one or more text portions each of which having a relevance-based score higher than a predetermined threshold or the first one or more text portions being ranked higher than a predetermined threshold in the relevance-based text ranking list. According to yet another exemplary selection model, the text selection unit 1202 combines the two ranking lists to find one or more text portions each of which having a combined score higher than a predetermined threshold. A combined score may be generated based on the relevance-based score with a first weight and the user interest-based score with a second weight. Different selection models may have different first and/or second weights.

The text selection unit 1202 may determine a selection model 1203 based on the user's previous preference or feedback, the feature(s) or topic of the content item, and/or statistics of different selection models. Based on a selection model 1203, the text selection unit 1202 selects one or more text portions and send them to the text modifying unit 1204.

The text modifying unit 1204 in this example receives the selected one or more text portions from the text selection unit 1202 and determines whether to modify them based on one or more modification thresholds 1205 stored in the snippet generation unit 612. According to a modification threshold, the text modifying unit 1204 may modify a text portion if it is too long or too short to be used directly in a snippet. For example, if a text portion is longer than a modification threshold, the text modifying unit 1204 will truncate the text portion but preserve keywords matching the user's search query, when the content item is in a search result in response to the search query. In another example, if another text portion is shorter than another modification threshold, the text modifying unit 1204 will add some text into the text portion but preserve the meaning of the text portion. The text modifying unit 1204 may modify a text portion based on knowledge retrieved from a knowledge database 1210 in the snippet generation unit 612. The knowledge database 1210 stores knowledge regarding different concepts, according to online activities and/or offline activities of people. For example, based on knowledge in the knowledge database 1210, the text modifying unit 1204 determines "association football" and "soccer" are two names referring to a same type of sport. Thus, if a text portion needs to be truncated for generating a snippet in response to a query term "soccer," the phrase "association football" should not be truncated as it is a match for the query "soccer" based on the knowledge. The text modifying unit 1204 may send one or more modified text portions to the snippet creation unit 1206.

The snippet creation unit 1206 in this example receives the one or more modified text portions from the text modifying unit 1204 and creates a snippet based on the one or more modified text portions. Since the one or more modified text portions were selected based on personal information and/or personal interest(s) of a user, the snippet is a personalized snippet for the user. The snippet creation unit 1206 may reorganize a text portion according to grammar retrieved from a grammar database 1212 in the snippet generation unit 612, e.g. to make the text portion become a smooth sentence or easy-understanding phrases. The snippet creation unit 1206 may also connect or combine the one or more text portions according to grammar retrieved from the grammar database 1212 to create the personalized snippet. For example, a snippet may include one or more sentences representing a topic of the content item and comprising keywords of most interest to the user, so that there is a high likelihood that the user will follow a reference to the content item, once the snippet is presented to the user together with the reference to the content item, e.g. the snippet 320 about ice dance ranking is presented immediately following a reference 310 to the content item including information about the ice dance ranking, as shown in FIG. 3.

Figure 13:
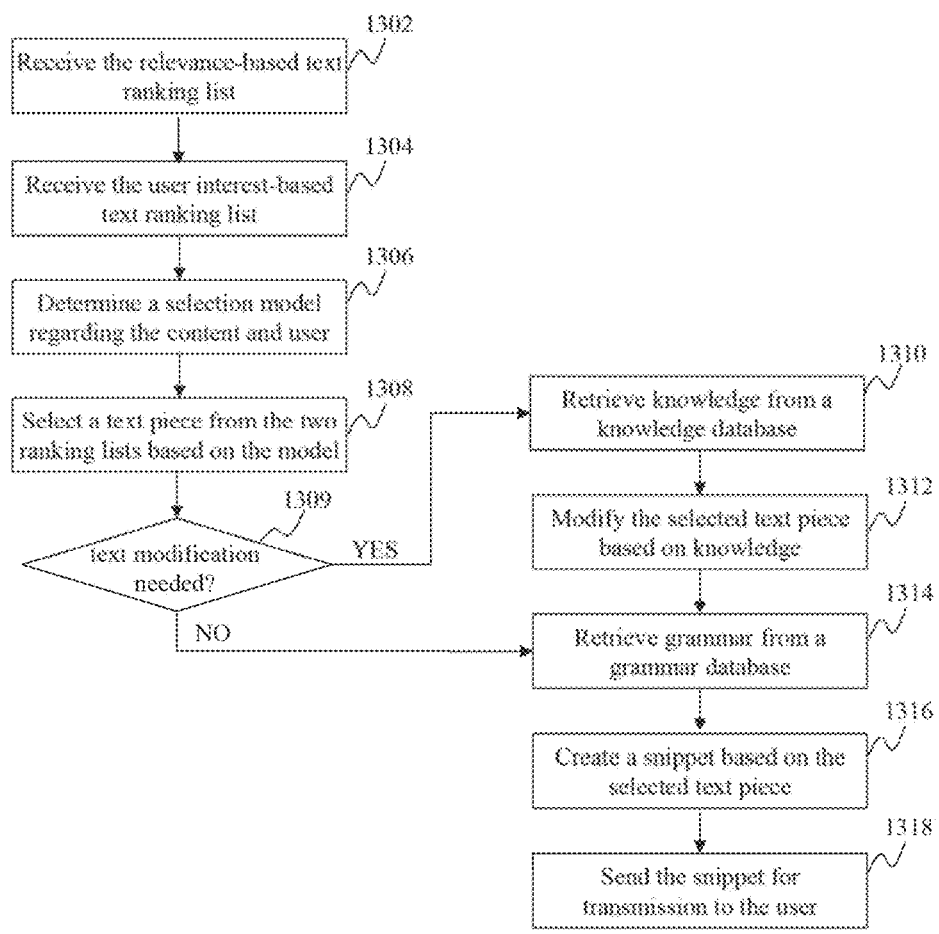
FIG. 13 is a flowchart of an exemplary process performed by a snippet generation unit, according to an embodiment of the present teaching.

FIG. 13 is a flowchart of an exemplary process performed by a snippet generation unit, e.g. the snippet generation unit 612 in FIG. 12, according to an embodiment of the present teaching. Starting at 1302, the relevance-based text ranking list is received. At 1304, the user interest-based text ranking list is received. At 1306, a selection model regarding the content and the user is determined. At 1308, a text piece/portion is selected from the two ranking lists based on the selection model. In one example, one or more text portions are selected of a content item to be provided to a user.

At 1309, it is checked whether a text modification is needed. If so, at 1310, knowledge is retrieved from a knowledge database, and the selected text piece is modified based on the knowledge at 1312, and the process moves on to 1314. Otherwise, the process goes to 1314 directly.

At 1314, grammar is retrieved from a grammar database. At 1316, a personalized snippet is created based on the selected text piece. At 1318, the personalized snippet is sent, e.g. to the snippet transmitting unit 614, for transmission to the user.

Figure 14:
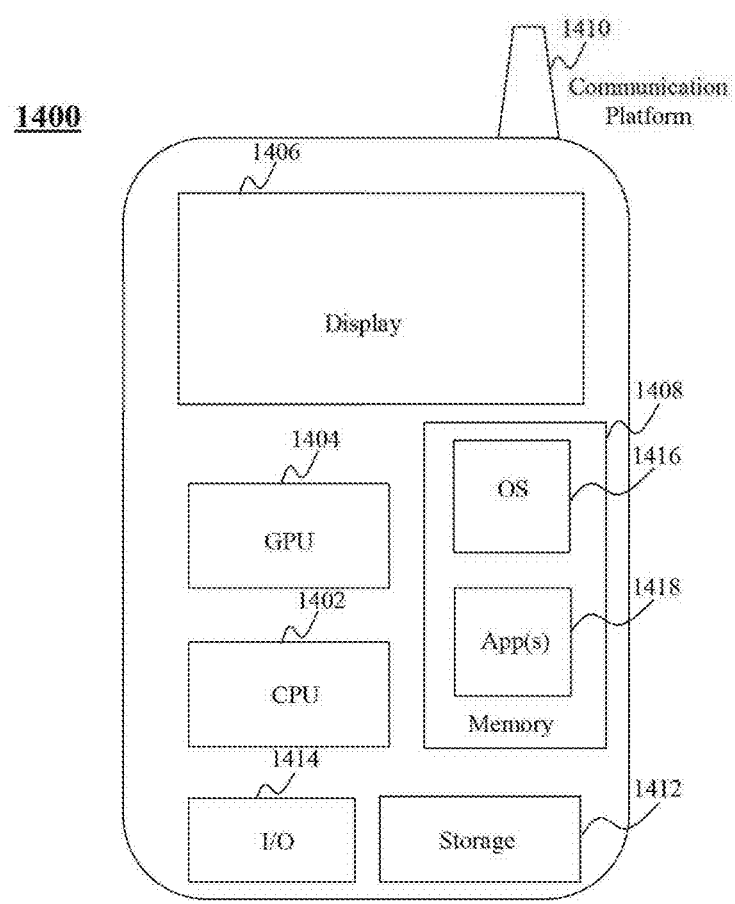
FIG. 14 depicts a general mobile device architecture on which the present teaching can be implemented.

FIG. 14 depicts a general mobile device architecture on which the present teaching can be implemented. In this example, a device of the user 410 is a mobile device 1400, including but is not limited to, a smart phone, a tablet, a music player, a handled gaming console, a GPS receiver. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1419. Any other suitable component, such as but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. The applications 1418 may include a web browser or any other suitable mobile search apps. Execution of the applications 1418 may cause the mobile device 1400 to perform some processing as described before. For example, the display of content items and search results is made by the GPU 1404 in conjunction with the display 1406. User inputs of search queries are received via the I/O devices 1414 and sent to a search engine via the communication platform 1410.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
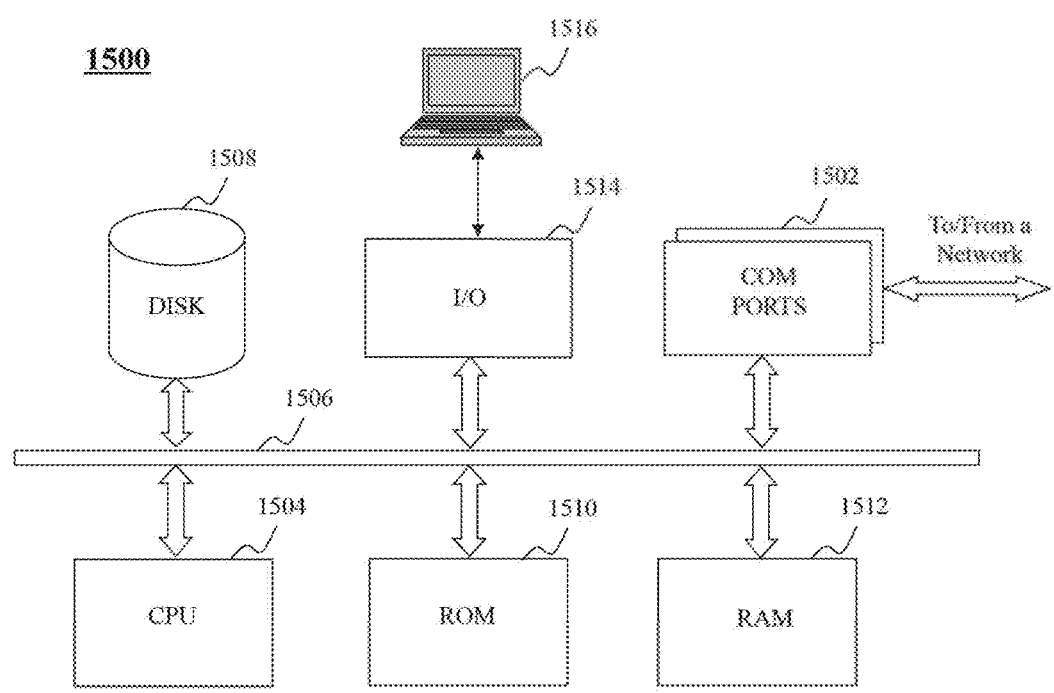
FIG. 15 depicts a general computer architecture on which the present teaching can be implemented.

FIG. 15 depicts a general computer architecture on which the present teaching can be implemented and has a functional block diagram illustration of a computer hardware platform that includes user interface elements. The computer may be a general-purpose computer or a special purpose computer. This computer 1500 can be used to implement any components of the personalized snippet generation architecture as described herein. Different components of the system, e.g., as depicted in FIGS. 4 and 5, can all be implemented on one or more computers such as computer 1500, via its hardware, software program, firmware, or a combination thereof. Although only one such computer is shown, for convenience, the computer functions relating to personalized snippet generation may be implemented in a distributed fashion on a number of similar platforms, to distribute the processing load.

The computer 1500, for example, includes COM ports 1502 connected to and from a network connected thereto to facilitate data communications. The computer 1500 also includes a CPU 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU 1504. The computer 1500 also includes an I/O component 1514, supporting input/output flows between the computer and other components therein such as user interface elements 1516. The computer 1500 may also receive programming and data via network communications.

Hence, aspects of the method of personalized snippet generation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing a personalized snippet, comprising:

receiving, via the communication platform, a request for a snippet related to content to be provided to a user;

obtaining a plurality of portions of the content;

calculating, for each of the plurality of portions, a first score based on information about of the user;

extracting one or more first features from the content;

obtaining one or more second features of each of the plurality of portions;

comparing, for each of the plurality of portions, the one or more first features with the one or more second features to calculate a second score representing a descriptive power of the portion with respect to the content;

generating a first ranked list of the plurality of portions based on the second score for each of the plurality of portions;

generating a second ranked list based on the first ranked list and the first score for each of the plurality of portions;

selecting one or more portions from the plurality of portions based on the first ranked list and the second ranked list;

creating the snippet related to the content based on the one or more portions by modifying the one or more portions based on information related to interaction activity of other users; and generating, in response to the request, a webpage including the snippet.

2. The method of claim 1, wherein the first score represents a likelihood that the user will follow a reference to the content if the snippet includes the portion.

3. The method of claim 2, wherein the likelihood is calculated based on at least one of: characteristics of the user, characteristics of the content, and characteristics of the plurality of portions.

4. The method of claim 2, wherein transmitting further comprises:
providing the reference to the content with the snippet to the user.

5. The method of claim 1, wherein the one or more portions are associated with highest first scores among the first ranked list of the plurality of portions.

6. The method of claim 1, wherein obtaining the plurality of portions of the content includes parsing the content into a plurality of text portions based on a topic of each text portion.

7. The method of claim 1, wherein calculating the first score comprises:
obtaining the user information comprising a user profile and/or a user interest profile of the user; and
determining one or more interests of the user based on the user profile and/or the user interest profile, wherein the first score is calculated based on the one or more second features and the one or more interests of the user.

8. The method of claim 1, wherein each of the one or more first features and the one or more second features includes at least one of: length, position, similarity to a title, containment of name entities, and keywords or categories of the content.

9. The method of claim 1, wherein creating the snippet comprises:
creating the snippet based on the one or more modified portions based on grammar information.

10. The method of claim 1, wherein calculating the first score comprises using a supervised learning model, such that the first ranked list is generated further based on the supervised learning model.

11. The method of claim 1, wherein generating the second ranked list comprises:
determining, for each portion of the plurality of portions of the first ranked list, whether a corresponding first score for each portion exceeds a threshold, wherein the one or more portions are selected based on the corresponding first score exceeding the threshold.

12. The method of claim 1, further comprising:
obtaining, based on a user ID associated with the user, a user profile for the user from a first database;
obtaining, based on the user ID, a user interest profile for the user from a second database; and
determining the information about the first user based on the user profile and the user interest profile.

13. The method of claim 1, wherein the interaction activity is one of an online interaction activity and offline interaction activity.

14. A system, having at least one processor, storage, and a communication platform connected to a network for providing a personalized snippet, comprising:
a snippet request analyzer configured to receive, via the communication platform, a request for a snippet related to content to be provided to a user;
a content parsing unit configured to obtain a plurality of portions of the content;
a user interest-based text ranking unit configured to calculate, for each of the plurality of portions, a first score based on information about the user;
a content retriever configured to extract one or more first features from the content;
a relevance-based text ranking unit configured to:
obtain one or more second features of each of the plurality of portions,
compare, for each of the plurality of portions, the one or more first features with the one or more second features to calculate a second score representing a descriptive power of the portion with respect to the content, and
generate a first ranked list of the plurality of portions based on the second score for each of the plurality of portions;
a user interest-based text ranking unit configured to generate a second ranked list based on the first ranked list and the first score for each of the plurality of portions;
a snippet generation unit configured to:
select one or more portions from the plurality of portions based on the first ranked list and the second ranked list, and
create the snippet related to the content based on the selected one or more portions by modifying the one or more portions based on information related to interaction activity of other users; and
a snippet transmitting unit configured to generate, in response to the request, a webpage including the snippet.

15. The system of claim 14, wherein the first score represents a likelihood that the user will follow a reference to the content if the snippet includes the portion.

16. The system of claim 15, wherein the likelihood is calculated based on at least one of: characteristics of the user, characteristics of the content, and characteristics of the plurality of portions.

17. The system of claim 14, wherein the one or more portions are associated with highest first scores among the first ranked list of the plurality of portions.

18. The system of claim 14, wherein the first score being calculated comprises the user interest-based text ranking unit being further configured to:
obtain the user information comprising a user profile and/or a user interest profile of the user; and
determine one or more interests of the user based on the user profile and/or the user interest profile, wherein the first score is calculated based on the one or more second features and the one or more interests of the user.

19. A machine-readable tangible and non-transitory medium having information recorded thereon for providing a personalized snippet of content, wherein the information, when read by the machine, causes the machine to perform the following:

receiving, via the communication platform, a request for a snippet related to content to be provided to a user;
obtaining a plurality of portions of the content;
calculating, for each of the plurality of portions, a first score based on information about of the user;
extracting one or more first features from the content;
obtaining one or more second features of each of the plurality of portions;
comparing, for each of the plurality of portions, the one or more first features with the one or more second features to calculate a second score representing a descriptive power of the portion with respect to the content;
generating a first ranked list of the plurality of portions based on the second score for each of the plurality of portions;
generating a second ranked list based on the first ranked list and the first score for each of the plurality of portions;
selecting one or more portions from the plurality of portions based on the first ranked list and the second ranked list;
creating the snippet related to the content based on the one or more portions by modifying the one or more portions based on information related to interaction activity of other users; and
generating, in response to the request, a webpage including the snippet.

20. The medium of claim 19, wherein the first score represents a likelihood that the user will follow a reference to the content if the snippet includes the portion.

21. The medium of claim 20, wherein the likelihood is calculated based on at least one of: characteristics of the user, characteristics of the content, and characteristics of the plurality of portions.

* * * * *